Patented Apr. 18, 1933

1,903,787

UNITED STATES PATENT OFFICE

WILLIAM C. LODGE, OF MONTREAL, QUEBEC, CANADA, ASSIGNOR TO MANSON CHEMICAL COMPANY, A CORPORATION OF NEW JERSEY

PAPER PRODUCT AND PROCESS OF MAKING SAME

No Drawing. Application filed September 28, 1929. Serial No. 396,006.

This invention relates to paper and paper materials and to the process of making same and relates especially to paper, paper board, and the like, prepared with the aid of a dispersion containing wax, waxy bodies, and so forth, as will be more fully hereinafter described and claimed.

In the present invention it is an object to prepare a paper, the pulp from which such paper is made carrying a highly dispersed form of wax, particularly a mineral wax such as paraffin or ceresin, in an aqueous medium containing an organic colloidal dispersing agent, preferably of the type of glue or starch. It is further an object in the preferred from of the invention to produce paper which is substantially free from added inorganic precipitates, and the like, tending to materially impair the strength of the product.

The procedure of incorporation of the wax dispersion may be carried out in two different ways: (1) Addition of such dispersion to the paper pulp or stock at some stage prior to sheeting into web form; and (2) Surfacing the sheet or web with such wax dispersion in order to form a highly water-resistant surface layer. In carrying out the first type of procedure I preferably introduce the wax dispersion at the beater or advantageously at some stage in the travel of the paper pulp subsequent to its departure from the beater and prior to the formation of the pulp into a sheet on the paper machine. As a specific step I may introduce the wax dispersion into the pulp at the screens, as I have found that advantages accrue from entry of the waxy material at this point.

Organic colloid dispersions may be made in the following illustrative manner.

*Example 1.*—4 parts of starch are heated together with 25 parts of water to a temperature above 85° C. This aqueous solution is then cooled to a temperature of approximately 52° C. To it is added with vigorous stirring one part of molten paraffin wax of a melting point of 51° C. and the stirring continued until the temperature of the mixture has dropped, either spontaneously or by the addition of cold water, to 49° C.

*Example 2.*—One part of starch is heated with 5 parts of water to a temperature of 85° C. and is then cooled to a temperature of 36° C. To it is added with vigorous stirring one part of molten petrolatum and the agitation continued until the temperature of the mixture has dropped, either spontaneously or by the addition of cold water, to 30° C.

*Example 3.*—One part of starch is heated with 5 parts of water to a temperature of 85° C. and is then cooled to a temperature of 36° C. To it is added with vigorous stirring one part of a molten mixture consisting of 75 per cent paraffin wax and 25 per cent of paraffin oil and the agitation continued until the temperature of the mixture has dropped, either spontaneously or by the addition of cold water, to 30° C.

*Example 4.*—One part of glue, which has previously been soaked in water over night or until soft, together with one part of starch is heated up in 10 parts of water to a temperature of 85° C. and is then allowed to cool to 35° C. To it is added with vigorous stirring 2 parts of molten petrolatum and the stirring is continued until the temperature of the mixture drops, either spontaneously or by the addition of cold water, to 33° C.

*Example 5.*—One part of glue, which has previously been soaked over night in water or until soft, is heated with 5 parts of water to a temperature of 52° C. and into the mixture is poured, with vigorous stirring, 2 parts of molten paraffin wax of a melting point of 50° C. and the agitation is continued until the temperature drops, either spontaneously or by the addition of cold water, to a temperature of 49° C.

It is preferable to add these dispersions at a time subsequent to the beating operation for the reason that a closer control may be obtained over the water-resisting properties of the sheet.

I have observed that when wax dispersions are used by addition directly to the paper pulp in the beater the wax may coagulate, in part at least, due to the temperature rising above the melting point of the wax or in other instances the discrete particles coming between two moving metal surfaces in the beater lose their protective coating and such unprotected particles coagulate. This may be avoided by the addition of the dispersion to the pulp at a later stage when, due to dilution with cold water, the temperature of the stock is such that it is substantially below the melting point of the waxy material and there is no possibility of the discrete particles being exposed to metal to metal contact such as occurs between the beater rolls and the bed plates.

I prefer to add the dispersion to the suspension of pulp just at the point when the suspension is about to pass through the screens of the paper machine. A dispersion containing a predetermined wax content is, for example, delivered to the stream of pulp by any suitable metering device. The dispersion and pulp are intimately mixed in the screening operation and substantially all or nearly all of the waxy material may be retained in the paper web.

Another way in which these dispersions may profitably be used is in the production of a sheet of paper which carries a coating commonly known in the art as tub sized papers. One method of using hydrocarbon dispersions in this way is the application to a sheet of dried or partially dried paper as it passes from one section of the driers to another. This procedure may be used in making such papers as writing papers. For example, the sheet passes from one section of the driers through a bath of wax dispersion, through squeeze rolls and then over another section of the driers.

Another method is the application of the dispersion to paper sheet in the so-called water-boxes on the calender stacks. This is particularly applicable to paper board. The sheet of paper leaving the driers passes through one or several stacks of rolls which may or may not be heated and which may carry a trough-shaped device known as a water-box through which water is circulated. These troughs are so adjusted that one side of the trough is formed by the sheet of paper as it travels around the calender roll and a certain amount of water is absorbed on the surface of the sheet, the object of which is to improve the finish or surface of the sheet. By substituting for water in this box a dispersion of the type described, a coating of the dispersion is applied which is dried by contact with hot rolls, thus imparting a desirable appearance and water-resistance to the sheet.

*Example 6.*—To a continuous stream containing 1,000 lbs. of beaten pulp at approximately 0.5 per cent consistency delivered at the paper machine screen is added in a continuous proportionate stream a dispersion consisting of 20 lbs. of starch, 20 lbs. of petrolatum, and 210 lbs. of water.

*Example 7.*—To a continuous stream containing 2,000 lbs. of beaten pulp at approximately 0.5 per cent consistency delivered at the paper machine screen is added in a continuous proportionate stream a dispersion consisting of 100 lbs. of starch, 25 lbs. of petrolatum, and 375 lbs. of water.

*Example 8.*—To a continuous stream containing 2,000 lbs. of beaten pulp at approximately 0.5 per cent consistency delivered at the paper machine screen is added in a continuous proportionate stream a dispersion consisting of 20 lbs. of starch, 20 lbs. of glue, 40 lbs. of paraffin wax, and 410 lbs. of water.

*Example 9.*—To a continuous stream containing 2,000 lbs. of beaten pulp at approximately 0.5 per cent consistency delivered at the paper machine screen is added in a continuous proportionate stream a dispersion consisting of 30 lbs. of glue, 30 lbs. of paraffin wax, 10 lbs. of paraffin oil, and 930 lbs. of water.

*Example 10.*—A 40 lb. sheet of manila paper in a dry or semi-dry state is passed through a dispersion consisting of 50 lbs. of starch, 50 lbs. of glue, 100 lbs. of petrolatum and 800 lbs. of water.

*Example 11.*—A 40 lb. sheet of manila paper in a dry or semi-dry state is passed through a dispersion consisting of 50 lbs. of starch, 50 lbs. of hydrocarbon wax and 900 lbs. of water.

*Example 12.*—A sheet of laminated paper board is treated on one side only, by substituting for water in the water-boxes of the calender stacks a dispersion consisting of 40 lbs. of starch, 50 lbs. of paraffin wax and 950 lbs. of water.

Comparison of results obtained with dispersions applied on screens.

| Per cent | | Water repellent | Strength | Size test | |
|---|---|---|---|---|---|
| Starch | Glue | | | | |
| None | None | None | Per cent 80 | Neg. | |
| 2 | 2 | 4% wax | 82 | 400″ ♀ | |
| 4 | None | 1% | 84 | 150″ | Paper |
| 1.5 | 1.5 | 3% wax | 77 | 360″ | |
| None | None | 3% rosin | 79 | 90″ | |
| None | None | None | 50 | Neg. | |
| None | None | 2% rosin | 48 | 2 hrs.° | |
| 2 | None | 1.5% petrolatum | 51 | 24 hrs.° | 15 pt. board |
| 2 | None | 2% wax | 50 | 36 hrs.° | |

COATINGS

| | | | | | |
|---|---|---|---|---|---|
| None | None | None | 58 | Neg. | |
| 4 | None | 1% wax | 62 | 280″ ♀ | |
| 2 | None | 1% | 59 | 250″ ♀ | Paper |
| 2 | 2 | 2% | 64 | 360″ | |
| None | None | None | 50 | Neg. | |
| 2 | None | 0.5% | 50 | 2 hrs.° | 15 pt. board |
| 1.0 | 1.0 | .25% | 50 | 1 hr.° | |

♀ Seconds required for penetration test 40# sheet floated on 2% ammonium thiocyanate, 1% ferric chloride used as top indicator.
° Time required for water to penetrate through.

In the foregoing specification I have referred principally to wax or paraffin wax as the hydrocarbon body employed in making a dispersion for incorporation in paper pulp. Such mineral wax or petroleum wax may range through the various grades of paraffin wax on the market from hard wax on the one hand to soft wax such as scale wax or petrolatum on the other hand. Also as the foregoing examples indicate I may employ wax which has been softened with a mineral oil such as any suitable petroleum hydrocarbon oil, preferably and specifically the grade known as paraffin oil. The latter embraces various non-volatile hydrocarbon oils of differing specific gravities. A fixed non-volatile oil preferably is used as a volatile oil or when containing any substantial proportion of volatile constituents would, when applied to paper, by loss of such constituents through evaporation result in a more or less gradual diminution in water resistance. While petroleum wax in its various forms is used in accordance with the preferred embodiment of the invention, I may employ not only other mineral waxes, such as ceresin or ozocerite, but also vegetable waxes, such as carnauba, candelilla, japan wax, bayberry tallow and other similar waxes, preferably in most instances when so added forming only a part of the total wax content. The modification of paraffin wax by admixture with it of other waxes is comprehended within the scope of the present invention.

From the foregoing it also will be apparent that I am seeking primarily to produce a dispersion light in color or sufficiently free from discoloring effect on paper pulp to allow of the use of a proportion of the dispersion sufficient to create a marked degree of water-resistance without throwing the paper off-color, that is creating a discoloration which would impair the market value of the product.

For low grade products I may, in some cases, employ pitches, tars, asphaltic bodies, and the like, in the form of an emulsion or dispersion with glue, starch or other organic colloidal dispersing agent and with or without the wax or waxes mentioned above. It is, however, to be clearly understood that such low grade dispersions which markedly discolor paper pulp form no part of the preferred phase of the invention, which aims to produce light colored paper free or substantially free from any discoloration caused by introduction of water-resistant agents.

A specific aspect of the invention comprehends the employment of starches which have been modified by heat treatment or chemical action, including such starches as are known as thin-boiling starches, also soluble starch or starch which has been partially solubilized in any suitable manner. The employment of such modified starches is particularly desirable with petroleum hydrocarbons of a waxy character. In the foregoing examples where starch is used such starch preferably is of the modified form or is a mixture of modified and unmodified starches. In some cases there may be added to the pulp, either with the wax dispersion or in any other suitable manner and at any suitable stage in the progress of the pulp to the paper machine, a quantity of uncooked starch such as chlorine treated starch in a pulverulent form. The particles of such starch are held in the pulp and carried with it. When subjected to the heat of the driers the starch particles are ruptured in contact with the pulp and waxy material, conferring advantageous properties on the finished paper.

What I claim is:

1. Paper material containing wax and starch deposited from a starch emulsion of the wax.

2. Paper material containing wax and an organic dispersing agent comprising starch and being substantially free from added inorganic bodies materially impairing strength.

3. Paper material containing wax and an albuminous dispersing agent.

4. In the process of making paper, the step which comprises adding to paper pulp at a stage subsequent to the beating operation and prior to sheeting of the paper pulp, an aqueous dispersion comprising wax and starch.

5. In the process of making paper, the step which comprises adding to paper pulp at a stage subsequent to the beating operation and prior to sheeting of the paper pulp, an aqueous dispersion comprising paraffin wax and starch.

6. In the process of making paper, the step which comprises adding to the pulp at the time of screening a dispersion comprising wax and starch.

7. In the process of making paper of increased water resistance. the step which comprises adding to the paper pulp at the time of screening a dispersed waxy material.

8. In the process of making paper of increased water resistance, the step which comprises adding to the paper pulp at the time of screening a dispersed paraffin wax.

9. In the process of making paper of increased water resistance, the step which comprises adding to the paper pulp at the time of screening a dispersion comprising a mixture of wax and oil.

10. In the process of making paper of increased water resistance, the step which comprises adding to the paper pulp at the time of screening a dispersion comprising petrolatum.

11. Paper material containing waxy bodies, starch and glue and being substantially free from added inorganic precipitates materially impairing strength.

12. Paper material containing hydrocarbon wax and an organic dispersing agent comprising glue.

13. In the process of making paper, the steps which comprise incorporating a wax dispersion and unruptured particles of modified starch with pulp, forming a sheet therefrom and thereafter rupturing the starch particles by heat.

14. A paper product carrying a wax emulsion in a medium containing an albuminous emulsifying agent.

15. A paper product carrying a paraffin wax emulsion in a medium containing a starchy emulsifying agent.

16. In the process of making paper, the step which comprises adding to paper pulp at a stage subsequent to the beating operation and prior to sheeting of the paper pulp, an aqueous dispersion comprising wax dispersed in a medium containing an albuminous emulsifying agent.

17. In the process of making paper, the step which comprises adding to paper pulp at a stage subsequent to the beating operation and prior to sheeting of the paper pulp, a paraffin wax dispersion in a medium containing a starchy dispersing agent.

18. In the process of making paper of increased water resistance, the step which comprises adding to the paper pulp at a stage subsequent to the beating operation and prior to sheeting of the paper pulp, an aqueous dispersion of waxy material.

WILLIAM C. LODGE.